BEST AVAILABLE COPY
Sept. 16, 1930. G. N. MAS Des. Re. 17,803
BOTTLE
Original Filed Jan. 22, 1929
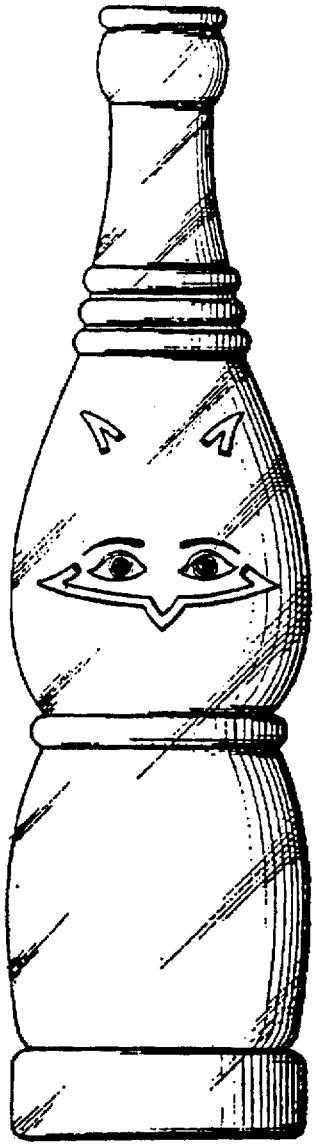
Inventor
George N. Mas
John Milton Jester
Attorney Reissued Sept. 16, 1930

Des. Re. 17,803

UNITED STATES PATENT OFFICE

GEORGE N. MAS, OF WASHINGTON, DISTRICT OF COLUMBIA

DESIGN FOR A BOTTLE

Original No. 78,167, dated April 2, 1929, Serial No. 29,725, filed January 22, 1929, for 14 years. Application for reissue filed June 25, 1930. Serial No. 36,161. Term of patent 14 years.

*To all whom it may concern:*

Be it known that I, GEORGE N. MAS, a citizen of the United States, residing at Washington, D. C., have invented a new, original, and ornamental Design for Bottles, of which the following is a specification, reference being had to the accompanying drawing, forming part thereof.

The figure is an elevational view of a bottle, showing my new design.

I claim:

The ornamental design for a bottle, as shown.

GEORGE N. MAS.